US012647258B2

(12) United States Patent
Kim et al.

(10) Patent No.: US 12,647,258 B2
(45) Date of Patent: Jun. 2, 2026

(54) PQC-BASED MQTT COMMUNICATION METHOD, DEVICE, SYSTEM, AND COMPUTER PROGRAM

(71) Applicant: SAMSUNG SDS Co., Ltd., Seoul (KR)

(72) Inventors: Eunkyung Kim, Seoul (KR); Jihoon Cho, Seoul (KR)

(73) Assignee: SAMSUNG SDS Co., Ltd., Seoul (KR)

( * ) Notice: Subject to any disclaimer, the term of this patent is extended or adjusted under 35 U.S.C. 154(b) by 166 days.

(21) Appl. No.: 18/522,497

(22) Filed: Nov. 29, 2023

(65) Prior Publication Data

US 2024/0187220 A1 Jun. 6, 2024

(30) Foreign Application Priority Data

Dec. 2, 2022 (KR) ........................ 10-2022-0166895

(51) Int. Cl.
| | |
|---|---|
| *H04L 9/08* | (2006.01) |
| *H04L 9/40* | (2022.01) |
| *H04L 67/1001* | (2022.01) |
| *H04L 67/61* | (2022.01) |

(52) U.S. Cl.
CPC .......... *H04L 9/0852* (2013.01); *H04L 63/166* (2013.01); *H04L 67/10015* (2022.05); *H04L 67/61* (2022.05)

(58) Field of Classification Search
CPC .................. H04L 9/0852; H04L 63/166; H04L 67/10015; H04L 67/61; H04L 63/0428; H04L 63/168; H04L 63/0471
See application file for complete search history.

(56) References Cited

U.S. PATENT DOCUMENTS

| | | | | |
|---|---|---|---|---|
| 9,942,209 | B2 * | 4/2018 | Chew | .................... H04L 63/061 |
| 10,678,906 | B1 * | 6/2020 | Loladia | .................. G06F 21/44 |
| 11,218,300 | B1 * | 1/2022 | Shea | ..................... H04L 9/0897 |
| 2013/0246640 | A1 * | 9/2013 | Ahrens | .............. H04L 65/1069 |
| | | | | 709/228 |
| 2016/0119426 | A1 * | 4/2016 | Van De Poel | ...... H04L 67/1097 |
| | | | | 709/213 |

(Continued)

FOREIGN PATENT DOCUMENTS

KR 10-2018-0070947 A 6/2018

OTHER PUBLICATIONS

Kurdi, Hassan, and Vijey Thayananthan. "A multi-tier MQTT architecture with multiple brokers based on fog computing for securing industrial IoT." Applied Sciences 12.14 (2022): 7173.*

(Continued)

*Primary Examiner* — Jimmy H Tran
(74) *Attorney, Agent, or Firm* — NSIP Law

(57) ABSTRACT

The present disclosure relates to a POC-based MQTT communication method, device, system, and computer program, and more particularly, to a POC-based communication method, device, system, and computer program enabling POC-based communication between MOTT brokers. The present disclosure provides a POC-based MQTT communication method performed by one or more processors in a first MQTT broker, the method including: collecting a message from one or more MQTT clients; performing POC-based encryption on the collected message by using a POC processing module; and transmitting the encrypted message to a second MQTT broker.

14 Claims, 14 Drawing Sheets

(56) References Cited

U.S. PATENT DOCUMENTS

| | | | |
|---|---|---|---|
| 2018/0270310 A1* | 9/2018 | Venkatesan | H04L 12/2836 |
| 2019/0173951 A1* | 6/2019 | Sumcad | H04L 67/55 |
| 2019/0205541 A1* | 7/2019 | Zimny | H04W 12/03 |
| 2019/0288975 A1* | 9/2019 | Hara | G06F 13/00 |
| 2019/0319808 A1* | 10/2019 | Fallah | H04L 9/3239 |
| 2020/0021586 A1* | 1/2020 | Schmidt | H04L 63/20 |
| 2020/0028946 A1* | 1/2020 | Vora | H04L 1/1874 |
| 2020/0280436 A1* | 9/2020 | Nix | H04L 9/0869 |
| 2021/0144176 A1* | 5/2021 | Dong | H04W 12/03 |
| 2021/0211271 A1* | 7/2021 | Kuang | H04L 9/065 |
| 2021/0211515 A1* | 7/2021 | Rozo | H04L 67/12 |
| 2022/0278833 A1* | 9/2022 | Nix | H04L 9/0618 |
| 2022/0294613 A1* | 9/2022 | Fischer | H04L 9/0833 |
| 2022/0353247 A1* | 11/2022 | Bastos | H04L 63/0428 |
| 2023/0041490 A1* | 2/2023 | Vangati | H04L 51/214 |
| 2023/0076669 A1* | 3/2023 | Acharya | H04L 9/0816 |
| 2023/0188323 A1* | 6/2023 | Ichikawa | H04L 9/0618 |
| | | | 380/28 |
| 2023/0216947 A1* | 7/2023 | Bernardi | H04L 67/10 |
| | | | 713/150 |
| 2023/0361994 A1* | 11/2023 | Nix | H04L 9/085 |
| 2024/0106636 A1* | 3/2024 | Nix | H04L 9/0852 |
| 2024/0129366 A1* | 4/2024 | Vemuri | H04W 76/19 |
| 2024/0323686 A1* | 9/2024 | Kumar | H04L 9/085 |
| 2024/0333493 A1* | 10/2024 | El-Moussa | H04L 9/14 |

OTHER PUBLICATIONS

Agus, Y. M., et al. "An efficient implementation of ntru encryption in post-quantum internet of things." 2020 27th International Conference on Telecommunications (ICT). IEEE, 2020.*

Anonymous: "Bridge between two Mosquito Brokers", Code Bay Blog, https://codebayblog.wordpress.com/2016/07/17/first-blog-post/, Jul. 17, 2016, (3 Pages in English).

Chung, Chia-Chin, et al., "Poster: When Post-Quantum Cryptography Meets the Internet of Things: An Empirical Study", Proceedings of the 20th Annual International Conference on Mobile Systems, Applications and Services, 2022, (p. 525-526).

European Office Action Issued on Jan. 30, 2024, in counterpart European Patent Application No. 23208701.5 (10 Pages in English).

Anonymous: "wolfMQTT with Post-Quantum KYBER and FALCON" wolfSSL, XP093203754, The Wayback Machine, Retrieved from the Internet: URL:https://web.archive.org/web/20220615192808/https://www.wolfssl.com/wolfmqtt-post-quantum-kyber-falcon/, pp. 1-2, Jun. 15, 2022.

European Office Action issued on Sep. 20, 2024, in counterpart European Patent Application No. 23 208 701.5 (9 pages).

* cited by examiner

FIG. 3

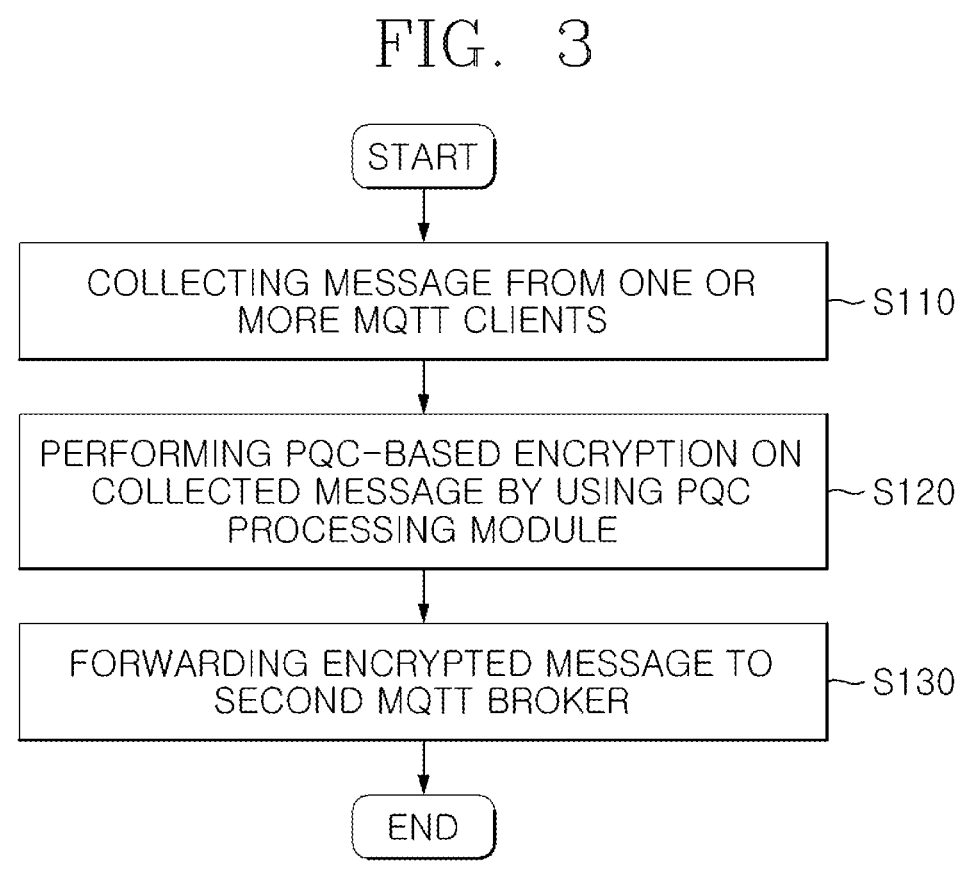

START

COLLECTING MESSAGE FROM ONE OR
MORE MQTT CLIENTS ~S110

PERFORMING PQC-BASED ENCRYPTION ON
COLLECTED MESSAGE BY USING PQC
PROCESSING MODULE ~S120

FORWARDING ENCRYPTED MESSAGE TO
SECOND MQTT BROKER ~S130

END

Figure 6C:
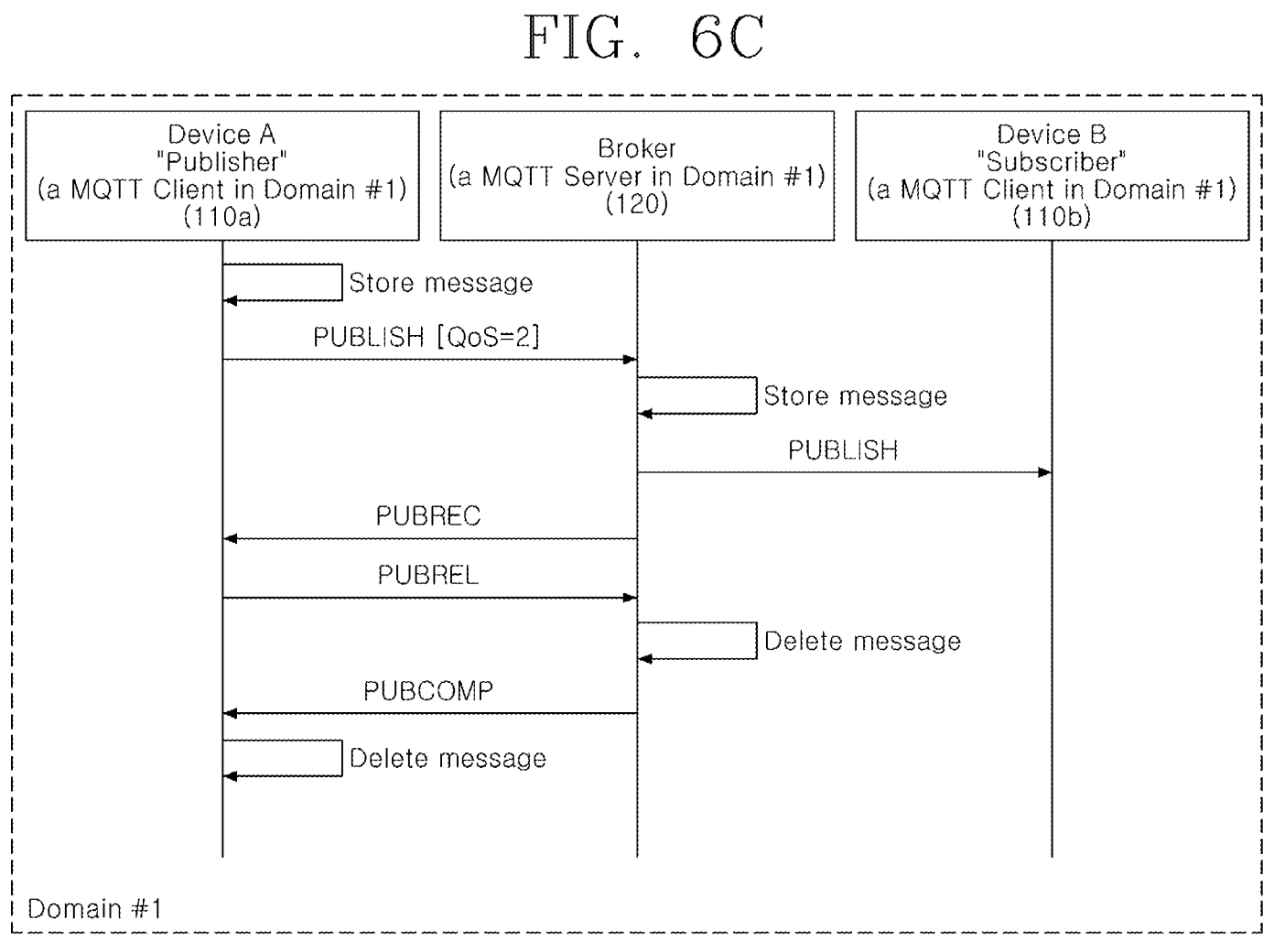

Device A
"Publisher"
(a MQTT Client in Domain #1)
(110a)

Broker
(a MQTT Server in Domain #1)
(120)

Device B
"Subscriber"
(a MQTT Client in Domain #1)
(110b)

Store message

PUBLISH [QoS=2]

Store message

PUBLISH

PUBREC

PUBREL

PUBCOMP

Delete message

Delete message

Domain #1

FIG. 7

| Name | Value | Direct of flow | Description |
|---|---|---|---|
| Reserved | 0 | Forbidden | Reserved |
| CONNECT | 1 | Client to Server | Connection request |
| CONNACK | 2 | Server to Client | Connect acknowledgment |
| PUBLISH | 3 | Client to Server or Server to Client | Publish message |
| PUBACK | 4 | Client to Server or Server to Client | Publish acknowledgment (QoS 1) |
| PUBREC | 5 | Client to Server or Server to Client | Publish received (QoS 2 delivery part 1) |
| PUBREL | 6 | Client to Server or Server to Client | Publish release (QoS 2 delivery part 2) |
| PUBCOMP | 7 | Client to Server or Server to Client | Publish complete (QoS 2 delivery part 3) |
| SUBSCRIBE | 8 | Client to Server | Subscribe request |
| SUBACK | 9 | Server to Client | Subscribe acknowledgment |
| UNSUBSCRIBE | 10 | Client to Server | Unsubscribe request |
| UNSUBACK | 11 | Server to Client | Unsubscribe acknowledgment |
| PINGREQ | 12 | Client to Server | PING request |
| PINGRESP | 13 | Server to Client | PING response |
| DISCONNECT | 14 | Client to Server or Server to Client | Disconnect notification |
| AUTH | 15 | Client to Server or Server to Client | Authentication exchange |

PQC-BASED MQTT COMMUNICATION METHOD, DEVICE, SYSTEM, AND COMPUTER PROGRAM

CROSS-REFERENCE TO RELATED APPLICATION(S)

This application is based on and claims priority to Korean Patent Application No. 10-2022-0166895, filed on Dec. 2, 2022, in the Korean Intellectual Property Office, the disclosure of which is herein incorporated by reference in its entirety.

BACKGROUND OF THE INVENTION

1. Field of the Invention

The present disclosure relates to a POC-based MQTT communication method, device, system, and computer program, and, more particularly, to a PQC-based MQTT communication method, device, system, and computer program enabling PQC-based communication between MQTT brokers.

2. Description of the Prior Art

Recently, along with the expansion of various communication services based on wireless communication technology, communication technologies and services for information exchange between devices, such as IoT (Internet of Things), are also rapidly spreading. Message Queuing Telemetry Transport (MQTT) may be provided as a communication protocol for the information exchange.

More specifically, MQTT is a publish/subscribe type communication protocol mainly used for communication between low-power and light-weight devices, and advantageously enables smooth communication even in a low-power and low-bandwidth environment, such as M2M (Machine-to-Machine) and IoT.

As shown in FIG. 1, an MQTT broker that collects messages from an MQTT client in the MQTT protocol may deliver the message to another MQTT broker through a communication network to share the collected message, and at this time, a security protocol, such as transport layer security (TLS), is used for security.

However, as the development of quantum computers capable of hacking standard public key cryptography, such as RSA and elliptic curve cryptography, has accelerated recently, the risk of security protocols, such as existing TLS, being neutralized through the Shore algorithm is becoming a reality, and accordingly, standardization and research on post-quantum cryptography (PQC), which can secure safety even after the practical use of quantum computing, is being actively conducted.

However, compared to the existing encryption algorithms, such as lattice-based cryptography and code-based cryptography, POC significantly requires computing resources for computation, memory usage, and the like.

However, the MQTT client is a small and low-power device that has limited computing resources, making it difficult to apply post-quantum cryptography (PQC) thereto. In addition, updating multiple MQTT clients that are already installed results in a considerable waste of time and money. Furthermore, since the MQTT broker is also configured to perform only a minimum of arithmetic operations in the MQTT protocol, it is practically difficult to apply POC in many cases due to the insufficient arithmetic capacity.

Accordingly, there is a demand for a method of ensuring security by applying POC to MQTT communication, but an effective solution has not yet been proposed.

SUMMARY OF THE INVENTION

An aspect of the present disclosure is to provide a POC-based MQTT communication method, device, system, and computer program that can ensure security even in the development of quantum computing technology by applying PQC to MQTT communication.

Another aspect of the present disclosure is to provide a POC-based MQTT communication method, device, system, and computer program that can improve security by applying POC even without updating a PQC application algorithm for an MQTT client.

Another aspect of the present disclosure is to provide a POC-based MQTT communication method, device, system, and computer program that ensure security even with MQTT brokers having poor computing power, by applying POC thereto.

Other detailed aspects of the present disclosure will be clearly identified and understood by experts or researchers in the art through the specific details described below.

A POC-based MQTT communication method according to an aspect of the present disclosure may be performed by one or more processors in a first MQTT broker, the method including: collecting a message from one or more MQTT clients; performing POC-based encryption on the collected message by using a POC processing module; and transmitting the encrypted message to a second MQTT broker.

The POC processing module may be installed in the first MQTT broker to provide a function for POC processing.

In addition, the method may further include, by the first MQTT broker, requesting the POC processing module to perform POC processing and confirming a response to the request.

Furthermore, the method may further include, by the first MQTT broker, requesting the second MQTT broker to perform communication based on POC and confirming a response to the request.

The method may further include, by the second MQTT broker, requesting the PQC processing module installed therein, to perform POC processing and confirming a response to the request.

In addition, the first MQTT broker may communicate with the second MQTT broker in a non-POC mode or in a POC mode according to an operation mode thereof.

When the first MQTT broker operates in the non-POC mode, the first MQTT broker may perform communication with the second MQTT broker by applying a transport layer security (TLS) algorithm to the message, and when the first MQTT broker operates in the POC mode, the first MQTT broker may perform communication with the second MQTT broker by applying the transport layer security (TLS) algorithm to the message to which PQC is applied.

Furthermore, when the first MQTT broker operates in the PQC mode, the first MQTT broker may transmit the message to the PQC processing module to receive the message to which POC is applied, and may perform communication with the second MQTT broker by applying the transport layer security (TLS) algorithm to the message to which PQC is applied.

In addition, in the above-mentioned operation, the first MQTT broker may perform POC-based encryption on one or a plurality of messages transmitted according to Quality of Service (QoS) of MQTT and transmit the messages.

Furthermore, the operation mode of the first MQTT broker may be determined in consideration of at least one of whether the POC processing module is installed or whether POC processing by the POC processing module is performable.

In addition, a computer-readable storage medium according to another aspect of the present disclosure stores instructions configured to, when executed by a processor, cause a device including the processor to implement operations for performing POC-based MQTT communication, and the operations may include: collecting a message from one or more MQTT clients; performing POC-based encryption on the collected message by using a POC processing module; and forwarding the encrypted message to a second MQTT broker.

In addition, an MQTT broker according to another aspect of the present disclosure is an MQTT broker including a processor, wherein the processor collects a message from one or more MQTT clients; performs POC-based encryption on the collected message by using a PQC processing module; and transmits the encrypted message to a second MQTT broker.

Here, the POC processing module may be installed in the MQTT broker to provide a function for POC processing.

In addition, the MQTT broker may request the PQC processing module to perform PQC processing and confirm a response to the request.

In addition, the MQTT broker may request the second MQTT broker to perform communication based on PQC and confirm a response to the request.

In addition, the second MQTT broker may request the PQC processing module 121 installed therein, to perform PQC processing and confirm a response to the request.

In addition, the MQTT broker may communicate with the second MQTT broker in a non-POC mode or in a POC mode according to an operation mode thereof.

The MQTT broker may perform, when operating in the non-POC mode, communication with the second MQTT broker by applying a transport layer security (TLS) algorithm to the message, and the MQTT broker may perform, when operating in the POC mode, communication with the second MQTT broker by applying the transport layer security (TLS) algorithm to the message to which PQC is applied.

Furthermore, when the MQTT broker operates in the POC mode, the MQTT broker may transmit the message to the PQC processing module to receive the message to which PQC is applied, and may perform communication with the second MQTT broker by applying the transport layer security (TLS) algorithm to the message to which POC is applied.

In addition, a POC processing module according to another aspect of the present disclosure may include a processor and be installed in a first MQTT broker that transmits a message to a second MQTT broker to provide a function for POC processing, wherein the processor may perform POC-based encryption processing on a message collected by the first MQTT broker; and provide the encrypted message to the first MQTT broker such that the POC-based encrypted message is transmitted to the second MQTT broker.

A POC-based MQTT communication method, device, system, and computer program according to an embodiment of the present disclosure can ensure security even in the development of quantum computing technology by applying POC to MQTT communication.

In addition, a PQC-based MQTT communication method, device, system, and computer program according to an embodiment of the present disclosure can improve security by applying POC even without updating a POC application algorithm for an MQTT client.

Furthermore, a PQC-based MQTT communication method, device, system, and computer program according to an embodiment of the present disclosure can ensure security even with MQTT brokers having poor computing power by applying POC thereto.

Effects obtainable in the present disclosure are not limited to the above-described effects, and any other effects not mentioned herein will be clearly understood from the following description by those skilled in the art to which the disclosure pertains.

BRIEF DESCRIPTION OF THE DRAWINGS

The accompanying drawings, which are included as part of the detailed description to help the understanding of the present disclosure, provide examples of the present disclosure and explain the technical idea of the present disclosure together with the detailed description.

FIG. 3 illustrates a flowchart of a POC-based MQTT communication method according to an embodiment of the present disclosure.

FIGS. 4 to 8 illustrate specific operations of a PQC-based MQTT communication method according to an embodiment of the present disclosure.

DETAILED DESCRIPTION

Figure 1:
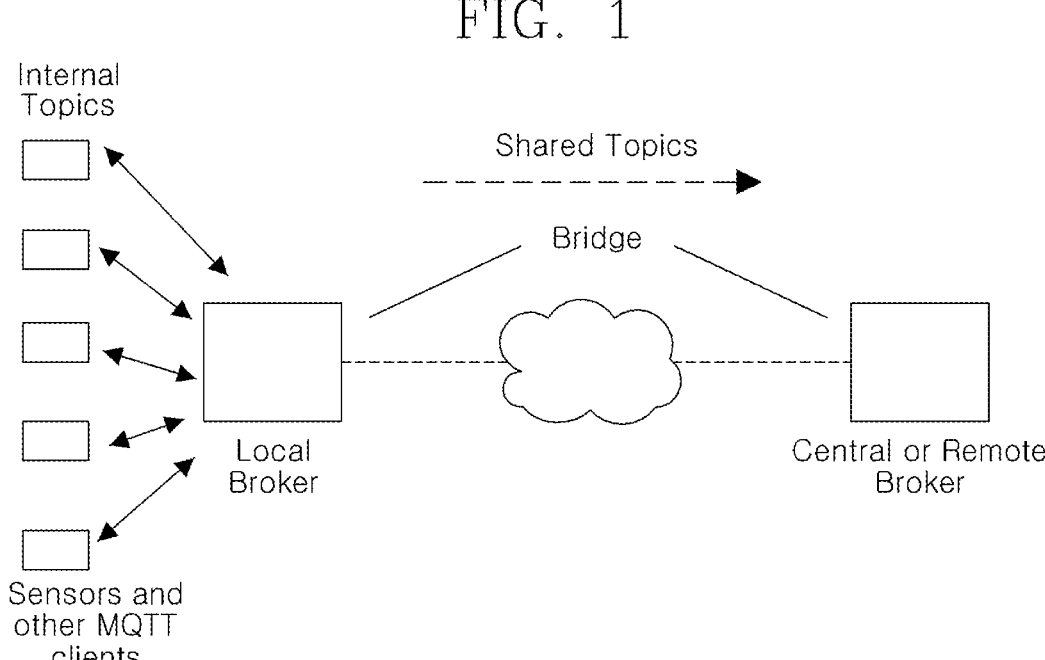
FIG. 1 illustrates the configuration and operation of a general MQTT communication system.

Hereinafter, embodiments disclosed in the present specification will be described in detail with reference to the accompanying drawings. Aspects, specific advantages and novel features of the present disclosure will become more apparent from the following detailed description and preferred embodiments taken in conjunction with the accompanying drawings.

Prior to this, the terms or words used in the present specification and claims are properly defined by the inventor to explain his/her invention in the best way, and should be interpreted as meanings and concepts consistent with the technical idea of the present disclosure, and it is only for describing the embodiments and should not be construed as limiting the present disclosure.

In assigning reference numerals to components, the same or similar components are assigned the same reference numerals regardless of reference numerals, and overlapping descriptions thereof will be omitted. The suffixes "module" and "unit" for the components used in the following description are given or used interchangeably in consideration of the ease of writing the specification, do not themselves have a distinct meaning or role, and may refer to software or hardware components.

In describing the components of the present disclosure, it should be understood that, when a component is expressed in a singular form, the component also includes a plural form unless otherwise specified. In addition, terms, such as "first" and "second", are used to distinguish one component from another component, and the components are not limited by the terms. Further, when one component is connected to the other component, it means that another component may be connected between the one component and the other component.

In addition, in describing the embodiments disclosed in the present specification, if it is determined that a detailed description of a related known technology may obscure the gist of the embodiment disclosed in the present specification, the detailed description thereof will be omitted. In addition, the accompanying drawings are only for easy understanding of the embodiments disclosed in the present specification, the technical idea disclosed in the present specification is not limited by the accompanying drawings, and it should be understood to include all changes, equivalents, or substitutes included in the spirit and technical scope of the present disclosure.

Hereinafter, exemplary embodiments of PQC-based MQTT communication method, device, system, and computer program according to the present disclosure will be described in detail with reference to the accompanying drawings.

Figure 2:
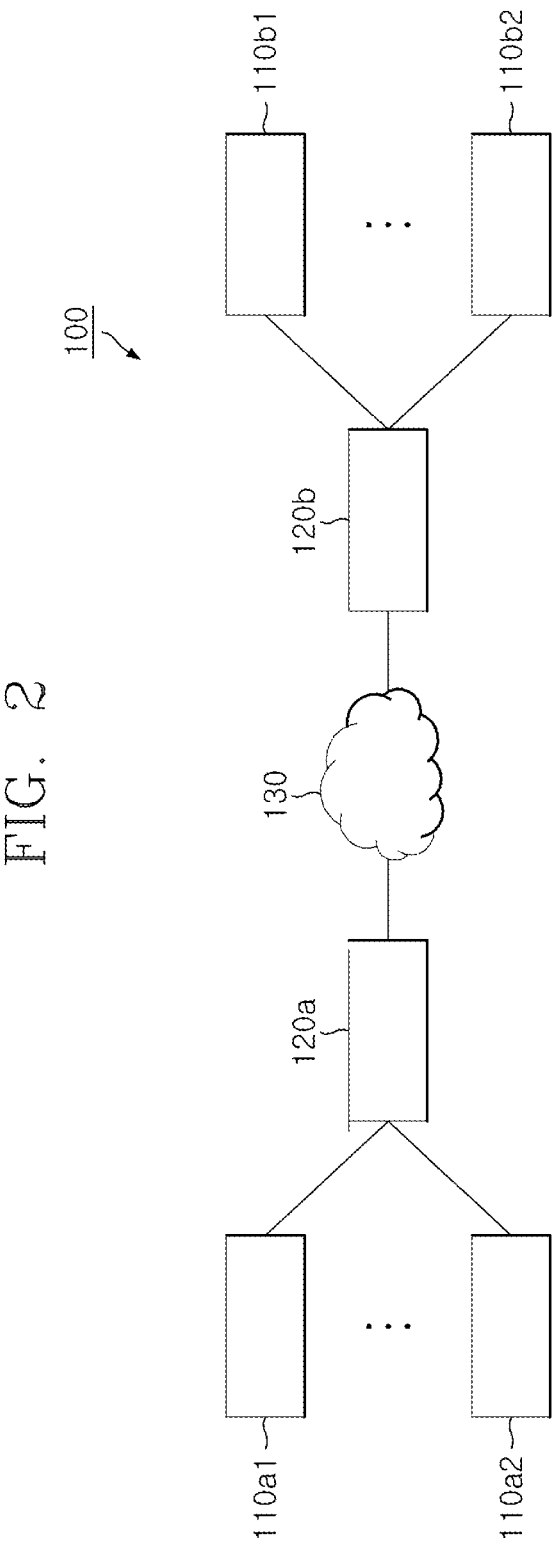
FIG. 2 illustrates a POC-based MQTT communication system according to an embodiment of the present disclosure.

First, FIG. 2 illustrates the configuration of a PQC-based MQTT communication system 100 according to an embodiment of the present disclosure.

As noted from FIG. 2, a POC-based MQTT communication system 100 according to an embodiment of the present disclosure may include a first MQTT broker 120a that collects messages published by one or more first MQTT clients 110a1 and 110a2, and a second MQTT broker 120b that receives a message from the first MQTT broker 120a and provides the message to one or more second MQTT clients 110b1 and 110b2 subscribing to the message.

At this time, the MQTT client 110 including the first MQTT clients 110a1 and 110a2 and the second MQTT clients 110b1 and 110b2 may be a sensor device or a small IoT device, but the present disclosure is not necessarily limited thereto, and various devices that perform communication by using the MQTT protocol may be used as an MQTT client 110.

In addition, the MQTT broker 120 including the first MQTT broker 120a and the second MQTT broker 120b may be a device that collects and processes messages by communicating with the MQTT client 110 through the MQTT protocol, but the present disclosure is not necessarily limited thereto, and the MQTT broker 120 may be separated into a device that collects messages by performing communication with the MQTT client 110 and a device that processes the collected messages, and may be implemented in various forms.

More specifically, the MQTT broker 120 may be implemented using one or two or more servers, but the present disclosure is not necessarily limited thereto. In addition, the MQTT broker 120 may be implemented as a dedicated device or as a processor driven in a device such as a server, and may be in various forms.

In addition, in FIG. 2, a wired network and a wireless network may be used as a communication network 130 connecting the first MQTT broker 120a and the second MQTT broker 120b, and specifically, may include a local area network (LAN), a metropolitan area network (MAN), a wide area network (WAN), and the like. In addition, the communication network 130 may include the well-known World Wide Web (WWW).

In addition, as shown in FIG. 3, the PQC-based MQTT communication method according to an embodiment of the present disclosure may be performed by one or more processors in the first MQTT broker 120a, the method including collecting a message from one or more MQTT clients 110 (S110), performing POC-based encryption on the collected message by using the PQC processing module 121 (S120), and transmitting the encrypted message to the second MQTT broker 120b (S130).

Here, the method shown in FIG. 3 may be performed, for example, by the MQTT broker 120, and the MQTT broker 120 and may further include the computing device of FIG. 11 and a computing device as described below in connection with FIG. 11. For example, the MQTT broker 120 may include a processor 10, and the processor 10 may perform data analysis by executing a command configured to implement an operation of performing data analysis.

The POC processing module 121 may be installed in the first MQTT broker 120a to provide a function for PQC processing.

In addition, the method may further include, by the first MQTT broker 120a, requesting the POC processing module 121 to perform POC processing and confirming a response to the request (not shown).

Furthermore, the method may further include, by the first MQTT broker 120a, requesting the second MQTT broker 120b to perform communication based on POC and confirming a response to the request (not shown).

The method may further include, by the second MQTT broker 120b, requesting the POC processing module 121 installed therein, to perform POC processing and confirming a response to the request (not shown).

In addition, the first MQTT broker 120a may communicate with the second MQTT broker 120b in a non-PQC mode or in a POC mode according to an operation mode thereof.

When the first MQTT broker 120a operates in the non-PQC mode, the first MQTT broker 120a may perform communication with the second MQTT broker 120b by applying a transport layer security (TLS) algorithm to the message, and when the first MQTT broker 120a operates in the POC mode, the first MQTT broker 120a may perform communication with the second MQTT broker 120b by applying the transport layer security (TLS) algorithm to the message to which PQC is applied.

Furthermore, when the first MQTT broker 120a operates in the PQC mode, the first MQTT broker 120a may transmit the message to the POC processing module 121 to receive the message to which POC is applied, and may perform communication with the second MQTT broker 120b by applying the transport layer security (TLS) algorithm to the message to which POC is applied.

In addition, in the above-mentioned operation, the first MQTT broker 120a may perform POC-based encryption on one or a plurality of messages transmitted according to Quality of Service (QoS) of MQTT and transmit the messages.

Furthermore, the operation mode of the first MQTT broker 120a may be determined in consideration of at least one of whether the POC processing module 121 is installed or whether POC processing by the POC processing module 121 is performable.

Accordingly, in the PQC-based MQTT communication method, device, system, and computer program according to an embodiment of the present disclosure, security can be ensured even in the development of quantum computing technology by applying POC to MQTT communication, security can be improved by applying POC even without updating a POC application algorithm for MQTT clients, and security can be ensured even with MQTT brokers having poor computing power, by applying PQC thereto.

Hereinafter, a POC-based MQTT communication method, device, system, and computer program according to an embodiment of the present disclosure will be described in more detail with reference to FIGS. 2 and 3.

First, in S110, the first MQTT broker 120a collects a message from one or more MQTT clients 110.

The message may include sensor data collected by the MQTT client 110 or various data calculated by the MQTT client 110.

Next, in S120, the first MQTT broker 120a performs PQC-based encryption on the collected message by using the PQC processing module 121.

The POC processing module 121 is installed in the first MQTT broker 120a to provide a function for PQC processing so as to provide an extended function such that previously distributed MQTT broker 120 having limited computing power can process POC requiring a significant amount of computation, but the present disclosure is not necessarily limited thereto.

More specifically, the POC processing module 121 may be implemented as a separate hardware device and connected to the first MQTT broker 120a through a connector to be driven, but the present disclosure is not necessarily limited thereto. In addition, the POC processing module 121 may be implemented as a software module and be installed to be driven in the first MQTT broker 120a, and may be implemented in various forms.

In addition, in S120, the first MQTT broker 120a may perform a process of requesting the POC processing module 121 to perform POC processing and confirming a response to the request.

Subsequently, the first MQTT broker 120a may also perform a process of requesting the second MQTT broker 120b to perform communication based on POC and confirming a response to the request.

The second MQTT broker 120b may also perform a process of requesting the PQC processing module 121 installed therein, to perform POC processing and confirming a response to the request.

When it is determined that communication is not performable by applying POC through the series of processes described above, the first MQTT broker 120a may communicate with the second MQTT broker 120b in a POC mode.

However, when it is determined that communication is not performable by applying POC due to the problem occurring in the POC processing module 121 of the first MQTT broker 120a or the POC processing module 121 of the second MQTT broker 120b, the first MQTT broker 120a may communicate with the second MQTT broker 120b in a non-PQC mode.

As described above, the operation mode of the first MQTT broker 120a may be determined in consideration of at least one of whether the PQC processing module 121 is installed or whether POC processing by the PQC processing module 121 is performable.

Accordingly, in S130, the first MQTT broker 120a transmits the encrypted message to the second MQTT broker.

For a more specific example, when the first MQTT broker 120a operates in the non-POC mode, the first MQTT broker 120a may perform communication with the second MQTT broker 120b by applying a transport layer security (TLS) algorithm to the message, and when the first MQTT broker 120a operates in the POC mode, the first MQTT broker 120a may perform communication with the second MQTT broker 120b by applying the transport layer security (TLS) algorithm to the message to which POC is applied, but the present disclosure is not necessarily limited thereto.

At this time, when the first MQTT broker 120a operates in the POC mode, the first MQTT broker 120a may transmit the message to the PQC processing module 121 to receive the message to which POC is applied, and may perform communication with the second MQTT broker 120b by applying the transport layer security (TLS) algorithm to the message to which POC is applied.

In addition, the first MQTT broker 120a may also perform POC-based encryption on one or a plurality of messages transmitted according to Quality of Service (QoS) of an MQTT protocol to transmit the messages to the second MQTT broker 120b.

Figures 4A, 4B:
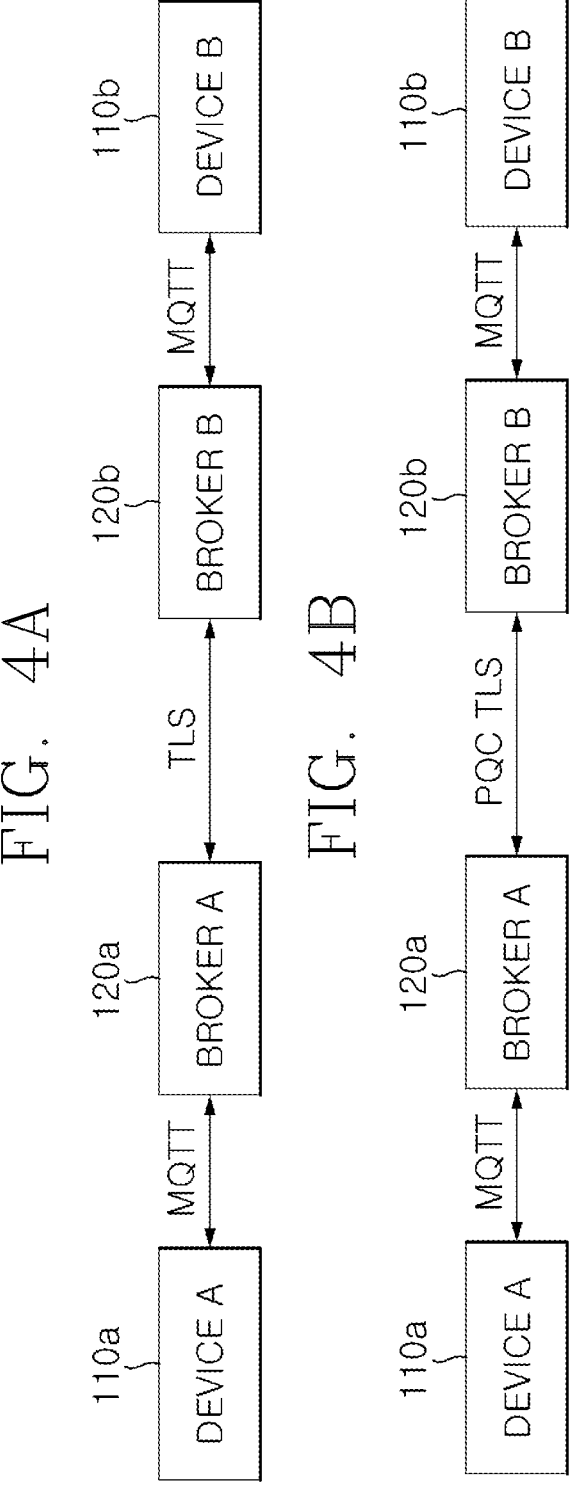

Accordingly, as shown in FIG. 4, in the PQC-based MQTT communication method according to an embodiment of the present disclosure, PQC is applied even to communication section between the MQTT brokers 120, which have failed to have quantum resistance by using an existing transport layer security (TLS) algorithm, thereby increasing the security of the communication therebetween.

Hereinafter, the POC-based MQTT communication method according to an embodiment of the present disclosure will be described in more detail with reference to FIG. 5, and the like.

Figure 5:
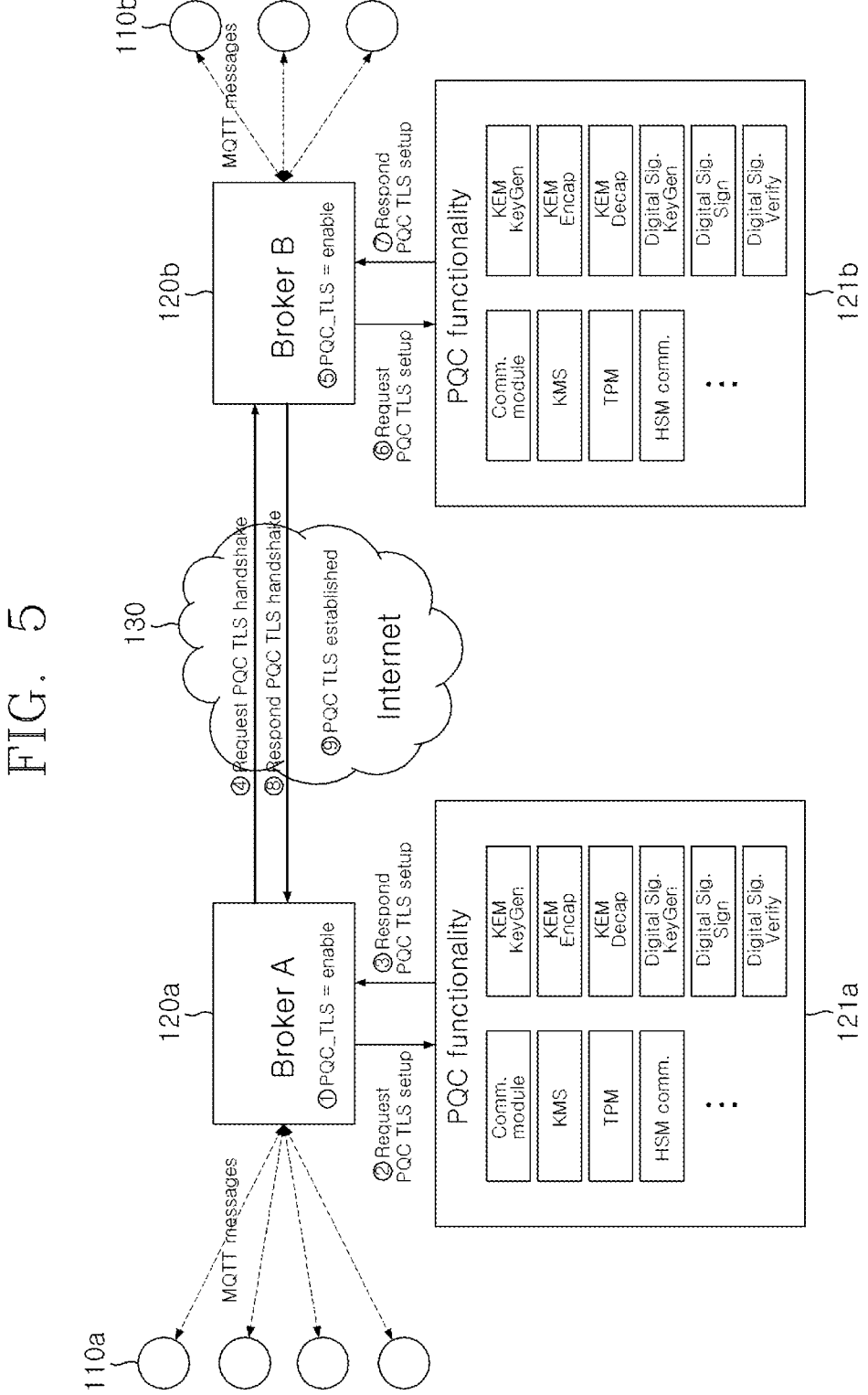

First, FIG. 5 illustrates a specific operational flow of the POC-based MQTT communication method according to an embodiment of the present disclosure.

As shown in FIG. 5, first, the first MQTT broker 120a may be configured to operate in a PQC mode by a manager, a control system, or the like (①) in FIG. 5).

Accordingly, the first MQTT broker 120a transmits a message requesting the POC processing module 121 installed therein, to perform POC processing (②) in FIG. 5).

The POC processing module 121 performs environment settings for POC processing and transmits a response to the request to the first MQTT broker 120a (③) in FIG. 5).

At this time, as shown in FIG. 5, the PQC processing module 121 may include functional blocks that perform various functions for performing POC processing.

For a more specific example, the POC processing module 121, as shown in FIG. 5, may include KEM arithmetic function block (performing key generation, encapsulation, and decapsulation of POC key encapsulation mechanism (KEM) standard algorithm), digital signature arithmetic function block (performing key generation, signing, and verification of POC digital signature standard algorithm), communication function block (performing communication with the MQTT broker 120), KMS function block (performing key management system functions for POC algorithm key management), TPM function block (for example, TPM or trusted platform module as a security function block for secret key storage), HSM communication function block (performing communication function for communication with hardware security module (HSM) for cryptographic operation and secret key storage), and the like.

Subsequently, the first MQTT broker 120a transmits a message requesting the second MQTT broker 120b to perform communication using PQC (④) in FIG. 5).

Accordingly, a mode may be set such that the second MQTT broker 120b operates in the POC mode (⑤) in FIG. 5).

The second MQTT broker 120*b* transmits a message requesting the POC processing module 121 installed therein, to perform POC processing ((⑥) in FIG. 5).

The PQC processing module 121 performs environment settings for POC processing and transmits a response to the request to the second MQTT broker 120*b* ((⑦) in FIG. 5).

Subsequently, the second MQTT broker 120*b* transmits a response to the request for communication execution by using the POC of the first MQTT broker 120*a* ((⑧) in FIG. 5).

Through the processes described above, the first MQTT broker 120*a* and the second MQTT broker 120*b* perform settings to operate in a POC mode to perform communication to which PQC is applied.

Figure 6A:
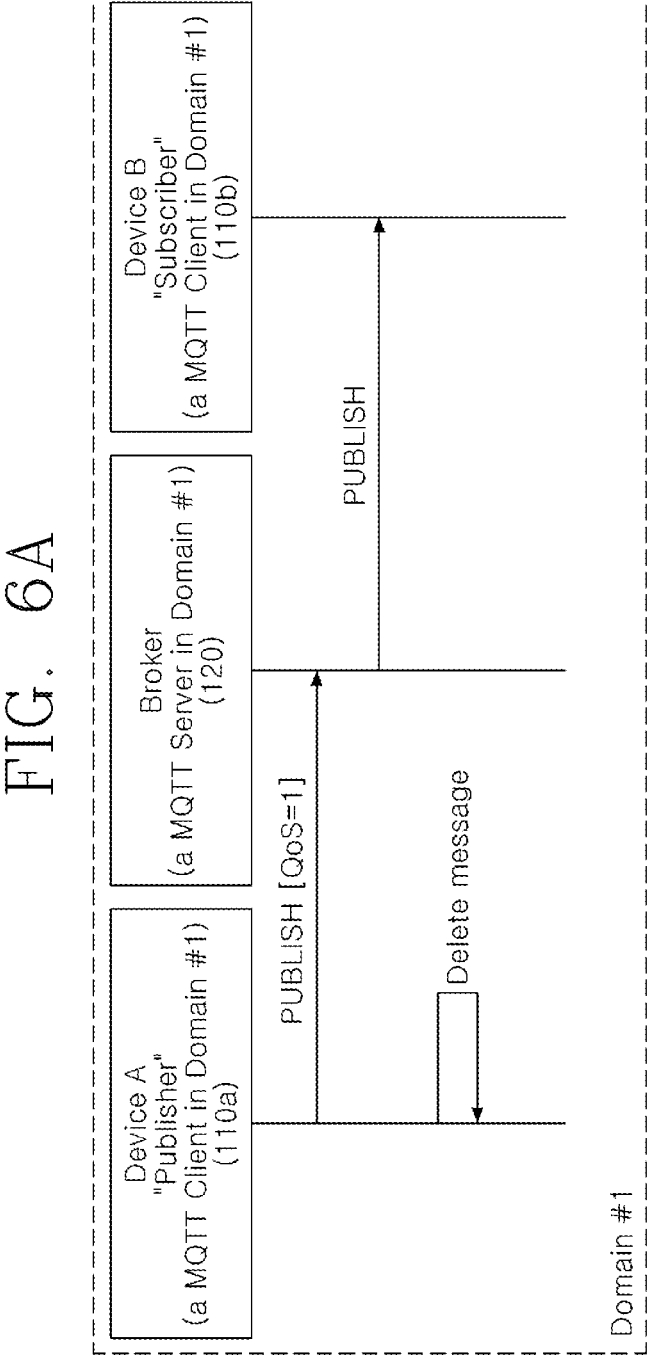
Figure 6B:
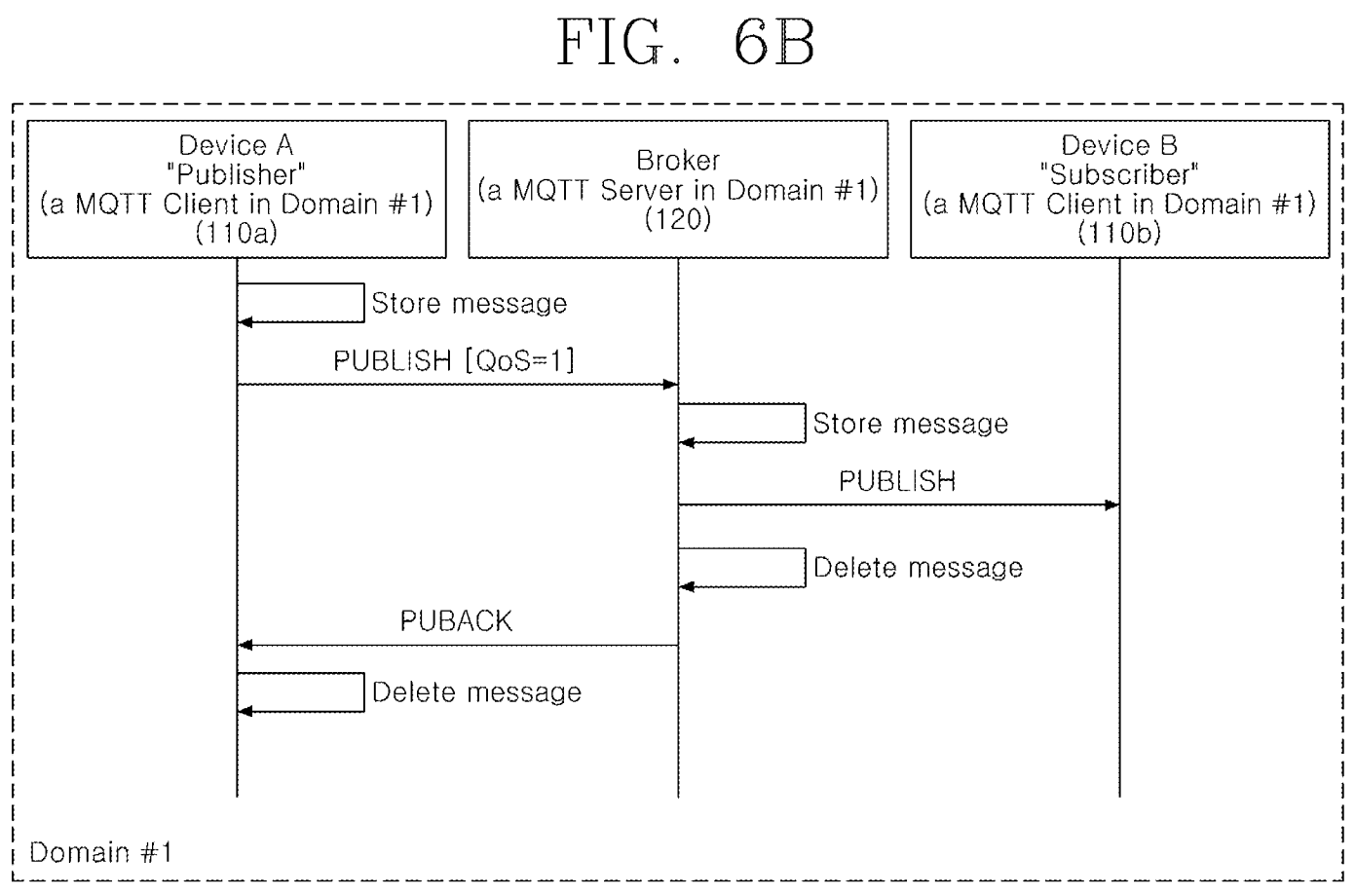

FIGS. 6A to 6C illustrate processes in which the MQTT broker 120 and the MQTT client 110 publish and subscribe a message.

At this time, as shown in FIGS. 6A to 6C, the algorithm for transmitting messages according to Quality of Service (QoS) may vary in the MQTT protocol.

In addition, FIG. 7 illustrates message types of the MQTT protocol used in FIGS. 6*a* to 6*c*.

In the PQC-based MQTT communication method according to an embodiment of the present disclosure, the first MQTT broker 120*a* may perform POC-based encryption on one or a plurality of messages transmitted according to Quality of Service (QoS) of an MQTT protocol.

Figure 8A:
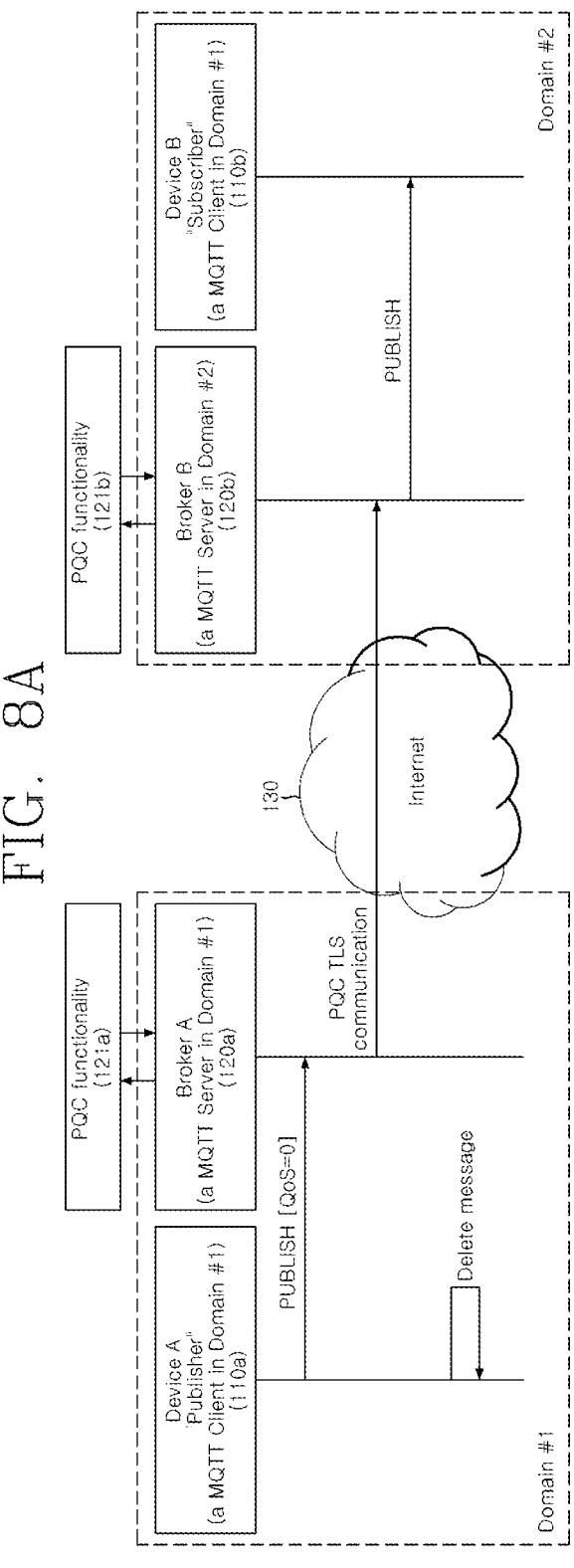

For a more specific example, when QoS is 0 in FIG. 8A, the publisher transmits an MQTT message once through PQC-based transport layer security (TLS) connection in the MQTT protocol, and thereafter, the publisher does not store transmission-related information and may perform communication without guaranteed QoS.

Accordingly, as shown in FIG. 8A, when the first MQTT client (device A) and the second MQTT client (device B) are connected through the first MQTT broker (broker A) and the second MQTT broker (broker B), each MQTT broker may be linked with the POC processing module, and may respond that the quantum-resistant algorithm is supported when negotiating is performed in a TLS handshake algorithm. Accordingly, when the negotiation is completed using the quantum resistant algorithm upon the result of a TLS handshake, each MQTT broker may request the POC processing module to perform an arithmetic operation related to the PQC KEM or digital signature algorithm necessary for transmitting and receiving TLS communication messages.

Through this, PQC security communication can be performed through the MQTT broker 120 linked with the POC processing module 121 without the update for performing the PQC arithmetic function which is performed by an end device such as the MQTT client 110.

Figure 8B:
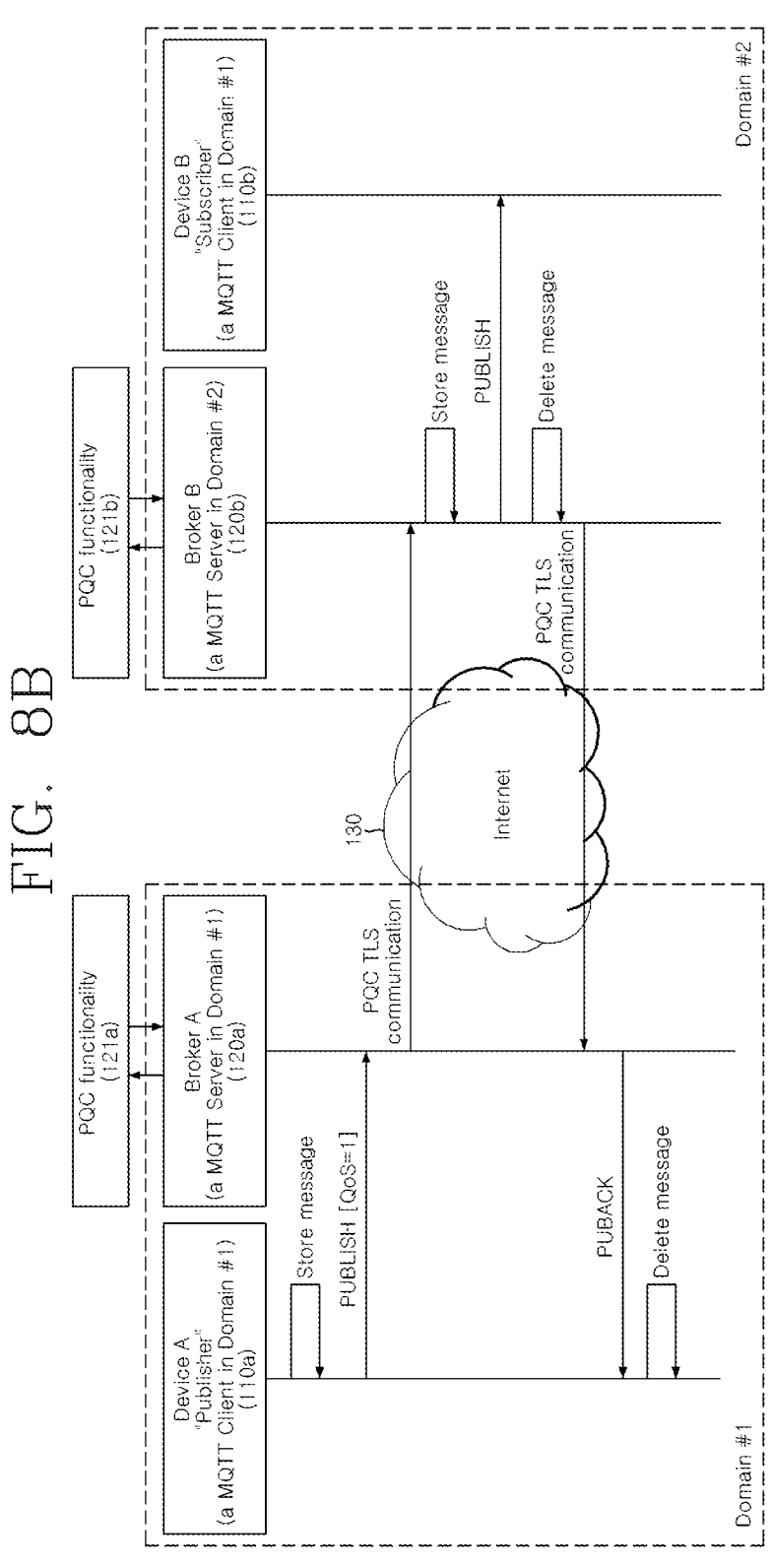

In addition, when Qos is 1 in FIG. 8B, the publisher transmits the message at least once until the publisher receives an MQTT message transmission completion confirmation (PUBACK) from the subscriber.

Even at this time, PQC security communication may be performed by connecting the PQC processing module 121 to the MQTT broker 120 through POC-based transport layer security (TLS) connection in the MQTT protocol.

Figure 8C:
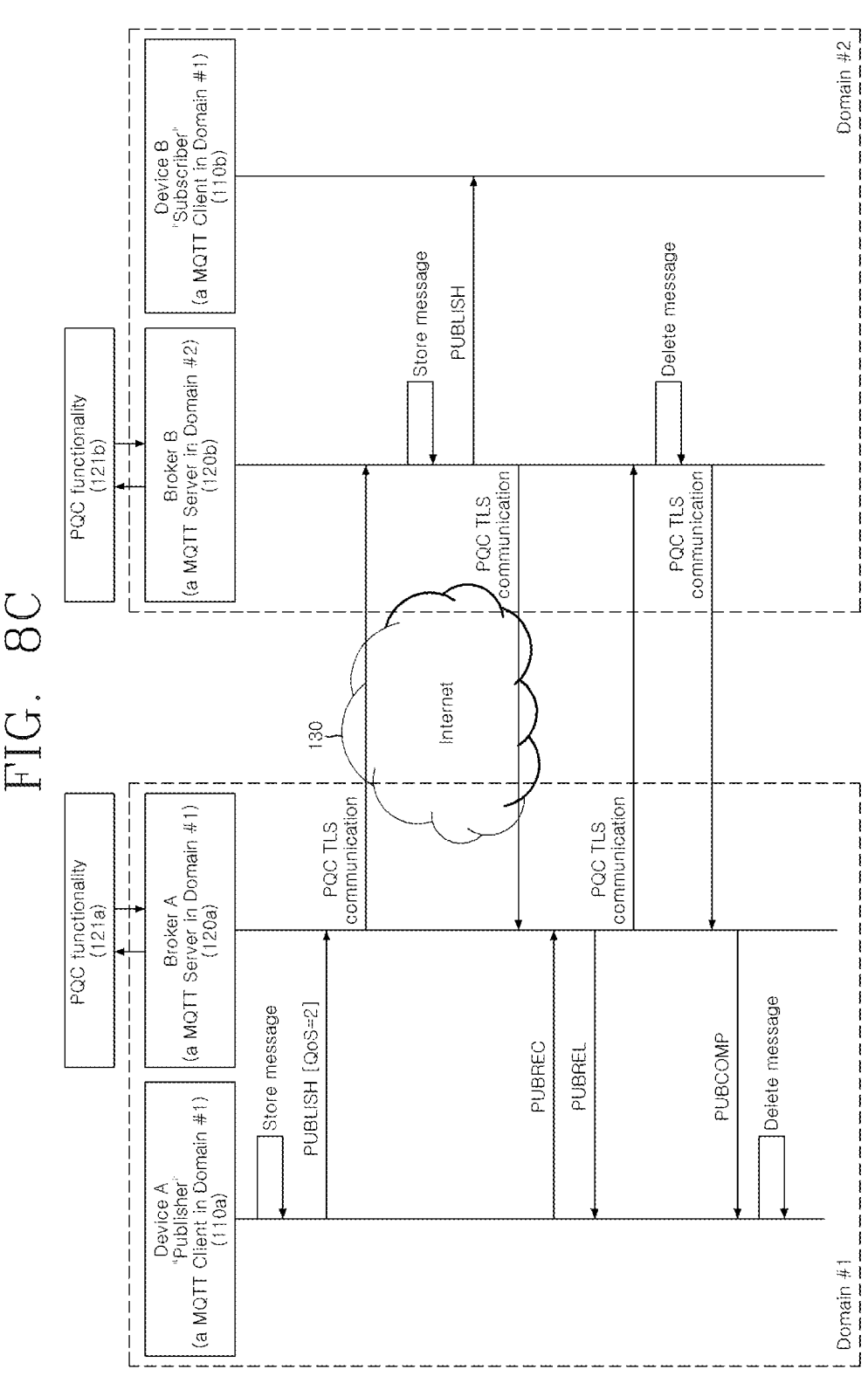

In addition, when Qos is 2 in FIG. 8C, the publisher transmits a message exactly once after confirming that the subscriber can receive the message.

Even at this time, PQC security communication may be performed by connecting the POC processing module 121 to the MQTT broker 120 through POC-based transport layer security (TLS) connection in the MQTT protocol.

In addition, a computer-readable storage medium according to another aspect of the present disclosure stores instructions configured to, when executed by a processor, cause a device including the processor to implement operations for performing PQC-based MQTT communication, and the operations may include: collecting a message from one or more MQTT clients; performing POC-based encryption on the collected message by using a POC processing module; and forwarding the encrypted message to a second MQTT broker. In this case, a computer program stored in the storage medium may be a computer program stored in a computer-readable storage medium in order to execute, on a computer, each operation of the above-mentioned PQC-based MQTT communication method. Here, the computer program may be not only a computer program including machine codes generated by a compiler, but also a computer program including high-level language codes that can be executed on a computer by using an interpreter or the like. At this time, the computer is not limited to a personal computer (PC) or a notebook computer, etc., and includes any information processing device including a server, a smartphone, a tablet PC, a PDA, a mobile phone, etc. which is equipped with a central processing unit (CPU) to execute a computer program.

In addition, the computer-readable storage medium may continuously store programs executable by the computer or temporarily store the programs for execution or download. In addition, the medium may be a variety of recording means or storage means in the form of a single hardware or in the form of several combined hardware, but is not limited to a medium directly connected to a certain computer system, and may be distributed on a network. Accordingly, the above detailed description should not be construed as limiting in all respects and should be considered illustrative. The scope of the present disclosure should be determined by reasonable interpretation of the appended claims, and all changes within the equivalent scope of the present disclosure are included in the scope of the present disclosure.

Figures 9, 10:
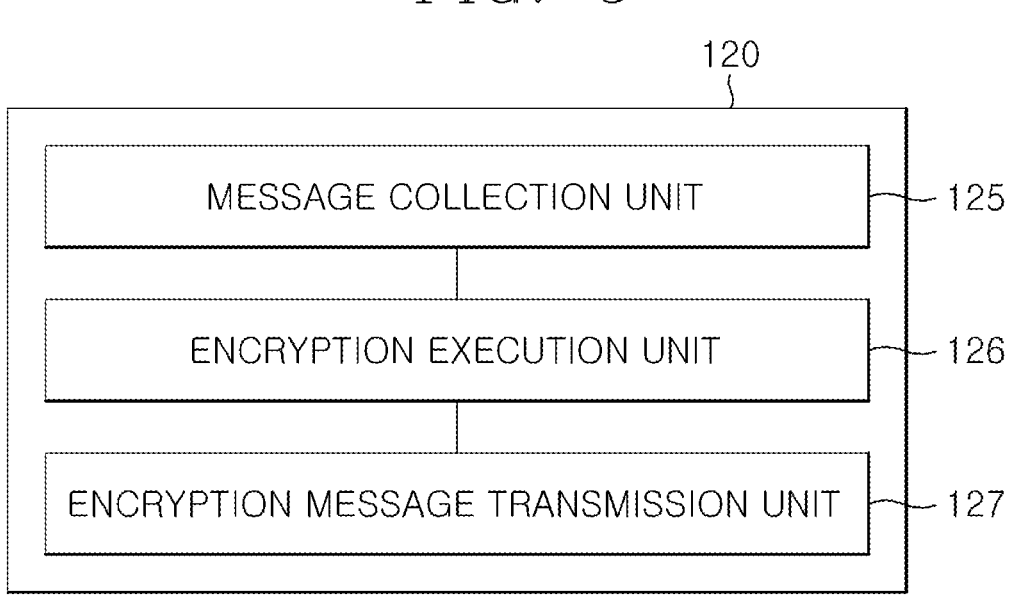
FIG. 9 is a block diagram of an MQTT broker according to an embodiment of the present disclosure.
FIG. 10 is a block diagram of a POC processing module according to an embodiment of the present disclosure.

FIG. 9 is a diagram of the MQTT broker 120 according to an embodiment of the present disclosure.

As shown in FIG. 9, the MQTT broker 120 according to an embodiment of the present disclosure may include a message collection unit 125, an encryption execution unit 126, and an encryption message transmission unit 127.

In addition, according to an embodiment of the present disclosure, the MQTT broker 120 may include the computing device of FIG. 11 and a computing device to be described below in connection with FIG. 11. For example, the MQTT broker 120 may include a processor 10, and the processor 10 may perform data analysis by executing instructions configured to implement an operation for performing data analysis, and the operation may include each operation of the message collection unit 125, the encryption execution unit 126, and the encryption message transmission unit 127.

In addition, FIG. 10 illustrates a configuration diagram of the POC processing module 121 according to an embodiment of the present disclosure.

As shown in FIG. 10, the PQC processing module 121 according to an embodiment of the present disclosure is a module installed in the MQTT broker 120 that transmits a message to the second MQTT broker 120*b* to provide a function for POC processing, and may include a POC encryption processing unit 1211 and an encryption message providing unit 1212.

In addition, according to an embodiment of the present disclosure, the PQC processing module 121 may include the computing device of FIG. 11 and a computing device to be described below in connection with FIG. 11. For example, the PQC processing module 121 may include a processor 10, and the processor 10 may perform data analysis by executing instructions configured to implement an operation for performing POC processing, and the operation may include each operation of the POC encryption processing unit 1211 and the encryption message providing unit 1212.

Subsequently, components of the MQTT broker 120 and the PQC processing module 121 according to an embodiment of the present disclosure will be separately described below. At this time, further details of the MQTT broker 120 according to an embodiment of the present disclosure can be inferred from the description of the PQC-based MQTT communication method according to an embodiment of the present disclosure described above, and thus will be omitted.

First, the message collection unit 125 of the MQTT broker 120 collects a message from one or more MQTT clients 110.

In addition, the encryption execution unit 126 of the MQTT broker 120 performs POC-based encryption on the collected message by using the POC processing module 121. Next, the encryption message transmission unit 127 of the MQTT broker 120 transmits the encrypted message to the second MQTT broker 120b.

In addition, the POC processing unit 1211 of the POC processing module 121 performs POC-based encryption processing on the message collected by the MQTT broker 120.

The encryption message providing unit 1212 of the PQC processing module 121 provides the encrypted message to the MQTT broker 120 such that POC encrypted message is transmitted to the second MQTT broker 120b.

Here, the POC processing module 121 may be installed in the MQTT broker 120 to provide a function for PQC processing.

In addition, the MQTT broker 120 may request the POC processing module 121 to perform POC processing and confirm a response to the request.

In addition, the MQTT broker 120 may request the second MQTT broker 120b to perform communication based on PQC and confirm a response to the request.

At this time, the second MQTT broker 120b may request the POC processing module 121 installed therein, to perform POC processing and confirm a response to the request.

In addition, the MQTT broker 120 may communicate with the second MQTT broker 120b in a non-POC mode or in a POC mode according to an operation mode thereof.

When the MQTT broker 120 operates in the non-PQC mode, the MQTT broker 120 may perform communication with the second MQTT broker 120b by applying a transport layer security (TLS) algorithm to the message, and when the MQTT broker 120 operates in the PQC mode, the MQTT broker 120 may perform communication with the second MQTT broker 120b by applying the transport layer security (TLS) algorithm to the message to which PQC is applied.

Furthermore, when the MQTT broker 120 operates in the PQC mode, the MQTT broker 120 may transmit the message to the POC processing module 121 to receive the message to which POC is applied, and may perform communication with the second MQTT broker 120b by applying the transport layer security (TLS) algorithm to the message to which PQC is applied.

In addition, the MQTT broker 120 may perform PQC-based encryption on one or a plurality of messages transmitted according to Quality of Service (QoS) of MQTT and transmit the messages.

Furthermore, the operation mode of the MQTT broker 120 may be determined in consideration of at least one of whether the POC processing module 121 is installed or whether PQC processing by the PQC processing module 121 is performable.

Figure 11:
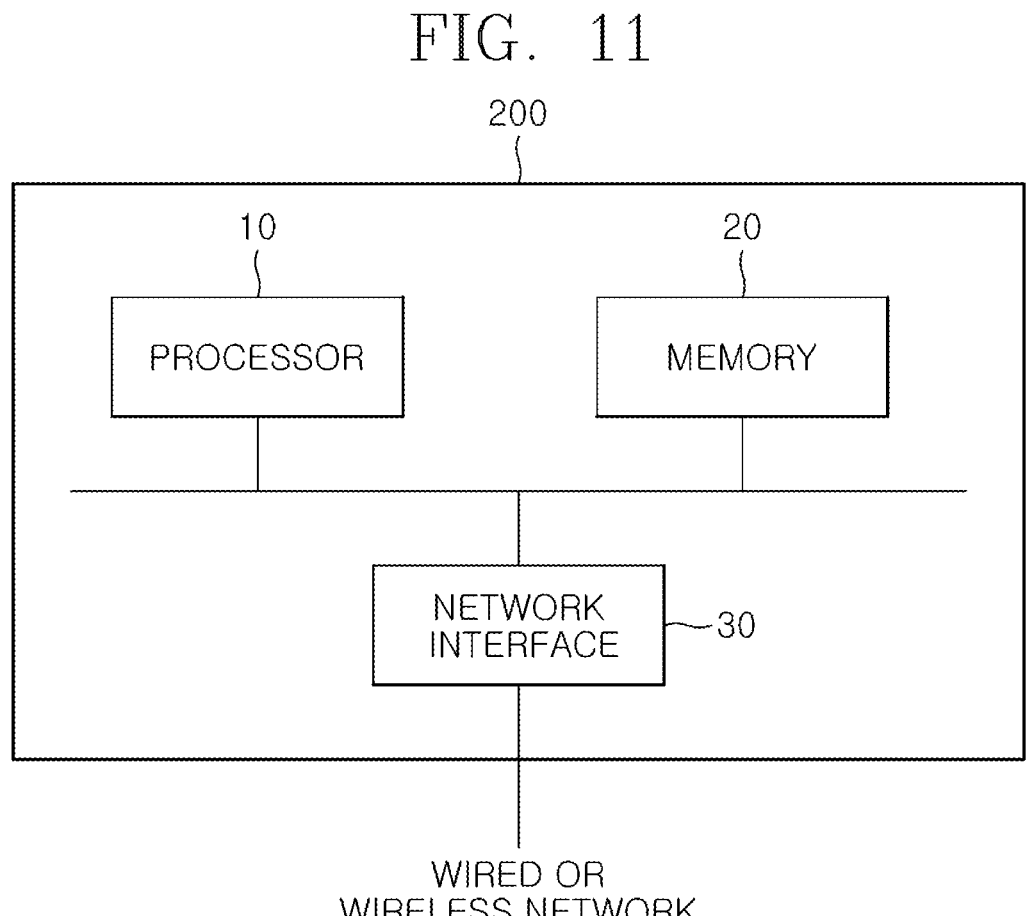
FIG. 11 illustrates a specific configuration of an MQTT broker and a POC processing module according to an embodiment of the present disclosure.

FIG. 11 illustrates a device 200 to which the proposed method of the present disclosure is applicable.

Referring to FIG. 11, the device 200 may be configured to implement a POC-based MQTT communication technique according to the proposed method of the present disclosure. For example, the device 200 may be the MQTT broker 120 or the POC processing module 121 for performing MQTT communication based on PQC.

For example, the device 200 to which the proposed method of the present disclosure is applicable may include network devices such as repeaters, hubs, bridges, switches, routers, gateways, computer devices such as desktop computers, workstations, mobile terminals such as smartphones, portable devices such as laptop computers, home appliances such as digital TV, means of transportation, such as a car, and the like. As another example, the device 200 to which the present disclosure is applicable may be included as a part of an application specific integrated circuit (ASIC) implemented in a system on chip (SoC) form.

The memory 20 may be connected to a processor 10 during operation, store programs and/or instructions for processing and controlling the processor 10, and store data and information used in the present disclosure, control information necessary for data and information processing according to the present disclosure, temporary data generated during data and information processing, and the like. The memory 20 may be implemented as a storage device such as read only memory (ROM), random access memory (RAM), erasable programmable read only memory (EPROM), electrically erasable programmable read-only memory (EEPROM), flash memory, and static RAM (SRAM), hard disk drive (HDD), solid state drive (SSD).

The processor 10 may be operatively connected to the memory 20 and/or the network interface 30 and controls the operation of each module in the device 200. In particular, the processor 10 may perform various control functions for performing the proposed method of the present disclosure. The processor 120 may also be called a controller, a micro-controller, a microprocessor, a microcomputer, or the like. The proposed method of the present disclosure may be implemented by hardware, firmware, software, or a combination thereof. When the present disclosure is implemented using hardware, the processor 10 may be provided with an application specific integrated circuit (ASIC) or a digital signal processor (DSP) configured to perform the present disclosure, a digital signal processing device (DSPD), a programmable logic device (PLD), a field programmable gate array (FPGA), and the like. However, when the proposed method of the present disclosure is implemented using firmware or software, the firmware or software may include instructions related to modules, procedures, or functions that perform functions or operations necessary to implement the proposed method of the present disclosure. When the instructions are stored in the memory 20 or stored in a computer readable recording medium (not shown) separate from the memory 20 to be executed by the processor 10, the device 120 will be configured to implement the proposed method of the present disclosure.

In addition, the device 200 may include a network interface device 30. The network interface device 30 is connected to the processor 10 during operation, and the processor 10 controls the network interface device 30 to transmit or receive wireless/wired signals that carry information and/or data, signals, messages, etc. through a wireless/wired network. The network interface device 30 may support various communication standards, such as IEEE 802 series, 3GPP LTE(-A), and 3GPP 5G, and may transmit and receive control information and/or data signals according to the communication standards. The network interface device 30 may be implemented outside the device 200 as needed.

Accordingly, in the PQC-based MQTT communication method, device, system, and computer program according to an embodiment of the present disclosure, security can be ensured even in the development of quantum computing technology by applying POC to MQTT communication, security can be improved by applying POC even without updating a POC application algorithm for MQTT clients, and security can be ensured even with MQTT brokers having poor computing power, by applying PQC thereto.

The particular implementations shown and described herein are illustrative examples of the present inventive concept and are not intended to otherwise limit the scope of the disclosure in any way. In addition, connecting members or connection by lines between the components shown in the drawings are examples of functional connections and/or physical or circuit connections, which can be replaced in real devices or can be represented as additional various functional connections, physical connection, or circuit connections. In addition, connecting members or connection by lines between components shown in the drawings may not be essential components for application of the present disclosure unless specifically stated, such as "essential" or "important".

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in any suitable order unless otherwise indicated herein or otherwise clearly contradicted by context. The use of any and all examples, or exemplary language (e.g., "such as") provided herein, is intended merely to better illuminate the present inventive concept and does not pose a limitation on the scope of the present inventive concept unless otherwise claimed. Numerous modifications and adaptations will be readily apparent to those of ordinary skill in this art without departing from the spirit and scope of the present inventive concept.

DESCRIPTION OF SYMBOLS

10: Processor
20: Memory
30: Interface device
50: Workflow execution information
100: PQC-based MQTT communication system
110: MQTT client
110a, 110a1, 110a2: First MQTT client
110b, 110b1, 110b2: Second MQTT client
120: MQTT broker
120a: First MQTT broker
120b: Second MQTT broker
121: PQC processing module
125: Message collection unit
126: Encryption execution unit
127: Encryption message transmission unit
1211: PQC processing unit
1212: Encryption message providing unit

130: Communication network
200: Device

What is claimed is:

1. A PQC-based MQTT communication method performed by one or more processors in a first MQTT broker, the method comprising:
   collecting a message from one or more MQTT clients;
   performing PQC-based encryption on the collected message by using a PQC processing module, the PQC processing module being provided in the first MQTT broker to provide a function for PQC processing; and
   transmitting the encrypted message to a second MQTT broker,
   wherein the first MQTT broker performs, when operating in a non-PQC mode, communication with the second MQTT broker by applying a transport layer security (TLS) algorithm to the collected message, and
   the first MQTT broker performs, when operating in a PQC mode, communication with the second MQTT broker by applying the transport layer security (TLS) algorithm to the encrypted message to which PQC is applied.

2. The method of claim 1, further comprising, by the first MQTT broker, requesting the PQC processing module to perform PQC processing and confirming a response to the request.

3. The method of claim 1, further comprising, by the first MQTT broker, requesting the second MQTT broker to perform communication based on PQC and confirming a response to the request.

4. The method of claim 3, further comprising, by the second MQTT broker, requesting the PQC processing module installed therein, to perform PQC processing and confirming a response to the request.

5. The method of claim 1, wherein when the first MQTT broker operates in the PQC mode,
   the first MQTT broker transmits the message to the PQC processing module to receive the message to which PQC is applied, and performs communication with the second MQTT broker by applying the transport layer security (TLS) algorithm to the message to which PQC is applied.

6. The method of claim 1, wherein, in the performing of the communication, the first MQTT broker performs PQC-based encryption on one or a plurality of messages transmitted according to Quality of Service (QoS) of MQTT and transmits the messages.

7. The method of claim 1, wherein the operation mode of the first MQTT broker is determined in consideration of at least one of whether the PQC processing module is installed or whether PQC processing by the PQC processing module is performable.

8. A non-transitory computer-readable storage medium which stores instructions configured to, when executed by a processor, cause a device comprising the processor to implement operations for performing PQC-based MQTT communication, wherein the operations comprise:
   collecting a message from one or more MQTT clients;
   performing PQC-based encryption on the collected message by using a PQC processing module, the PQC processing module being provided in a first MQTT broker to provide a function for PQC processing; and
   forwarding the encrypted message to a second MQTT broker,
   wherein the first MQTT broker performs, when operating in a non-PQC mode, communication with the second MQTT broker by applying a transport layer security (TLS) algorithm to the collected message, and wherein the first MQTT broker performs, when operating in a PQC mode, communication with the second MQTT broker by applying the transport layer security (TLS) algorithm to the encrypted message to which PQC is applied.

9. An MQTT broker comprising a processor, wherein the processor is configured to:

collect a message from one or more MQTT clients;

perform PQC-based encryption on the collected message by using a PQC processing module, the PQC processing module being provided in the MQTT broker to provide a function for PQC processing; and transmit the encrypted message to a second MQTT broker, wherein the first MQTT broker performs, when operating in a non-PQC mode, communication with the second MQTT broker by applying a transport layer security (TLS) algorithm to the collected message, and wherein the first MQTT broker performs, when operating in a PQC mode, communication with the second MQTT broker by applying the transport layer security (TLS) algorithm to the encrypted message to which PQC is applied.

10. The MQTT broker of claim 9, wherein the MQTT broker requests the PQC processing module to perform PQC processing and confirms a response to the request.

11. The MQTT broker of claim 9, wherein the MQTT broker requests the second MQTT broker to perform communication based on PQC and confirms a response to the request.

12. The MQTT broker of claim 11, wherein the second MQTT broker requests the PQC processing module installed therein, to perform PQC processing and confirms a response to the request.

13. The MQTT broker of claim 9, wherein when the MQTT broker operates in the PQC mode, the MQTT broker transmits the message to the PQC processing module to receive the message to which PQC is applied, and performs communication with the second MQTT broker by applying the transport layer security (TLS) algorithm to the message to which PQC is applied.

14. A PQC processing module which comprises a processor and is installed in a first MQTT broker that transmits a message to a second MQTT broker, to provide a function for PQC processing, wherein the processor is configured to:

perform PQC-based encryption processing on a message collected by the first MQTT broker; and provide the encrypted message to the first MQTT broker such that the PQC-based encrypted message is transmitted to the second MQTT broker, wherein the first MQTT broker performs, when operating in a non-PQC mode, communication with the second MQTT broker by applying a transport layer security (TLS) algorithm to the message, and wherein the first MQTT broker performs, when operating in a PQC mode, communication with the second MQTT broker by applying the transport layer security (TLS) algorithm to the PQC-based encrypted message to which PQC is applied.

* * * * *